US012081351B2

(12) United States Patent
Blum et al.

(10) Patent No.: US 12,081,351 B2
(45) Date of Patent: Sep. 3, 2024

(54) CONTEXT-DEPENDENT IN-CALL VIDEO CODEC SWITCHING

(71) Applicant: Google LLC, Mountain View, CA (US)

(72) Inventors: Niklas Blum, Mountain View, CA (US); Magnus Flodman, Mountain View, CA (US); Christoffer Rodbro, Mountain View, CA (US); Philip Eliasson, Mountain View, CA (US); Kari Helgason, Mountain View, CA (US)

(73) Assignee: Google LLC, Mountain View, CA (US)

( * ) Notice: Subject to any disclaimer, the term of this patent is extended or adjusted under 35 U.S.C. 154(b) by 22 days.

(21) Appl. No.: 17/647,370

(22) Filed: Jan. 7, 2022

(65) Prior Publication Data
US 2022/0131716 A1 Apr. 28, 2022

Related U.S. Application Data

(63) Continuation of application No. 16/717,936, filed on Dec. 17, 2019, now Pat. No. 11,233,669.

(51) Int. Cl.
*H04L 12/18* (2006.01)
*H04L 65/1083* (2022.01)
(Continued)

(52) U.S. Cl.
CPC ...... *H04L 12/1822* (2013.01); *H04L 12/1827* (2013.01); *H04L 65/1086* (2013.01);
(Continued)

(58) Field of Classification Search
CPC ............ H04L 12/1822; H04L 12/1827; H04L 65/1086; H04L 65/70; H04L 65/752;
(Continued)

(56) References Cited

U.S. PATENT DOCUMENTS

| 10,212,198 B1 | 2/2019 | Kielhofner et al. |
| 10,554,992 B2 | 2/2020 | Wan et al. |

(Continued)

FOREIGN PATENT DOCUMENTS

JP 2004129466 A 4/2004

OTHER PUBLICATIONS

International Search Report, PCT Application No. PCT/US2020/065441, dated Dec. 16, 2020, 14 pages.
(Continued)

*Primary Examiner* — Thomas J Dailey
(74) *Attorney, Agent, or Firm* — Honigman LLP; Brett A. Krueger

(57) ABSTRACT

A method for context-dependent in-call video codec switching includes receiving an indication that a far-side endpoint includes a capability to switch from an initial video codec to a secondary video codec during a call. During a call with the far-side endpoint, the method includes determining that a performance of an encoder satisfies a codec switching threshold. The codec switching threshold indicates that the performance of the encoder justifies switching from the initial video codec mid-stream of the call. During a call with the far-side endpoint, the method also includes switching from the initial video codec initially negotiated to govern the call to the secondary video codec.

20 Claims, 8 Drawing Sheets

(51) Int. Cl.
*H04L 65/70* (2022.01)
*H04L 65/75* (2022.01)
*H04L 65/752* (2022.01)
*H04L 65/80* (2022.01)
*H04M 3/56* (2006.01)
*H04N 7/15* (2006.01)
*H04N 21/2343* (2011.01)
*H04N 21/24* (2011.01)
*H04N 21/4788* (2011.01)
*H04N 21/658* (2011.01)

(52) U.S. Cl.
CPC ............ *H04L 65/70* (2022.05); *H04L 65/752* (2022.05); *H04L 65/762* (2022.05); *H04L 65/765* (2022.05); *H04L 65/80* (2013.01); *H04M 3/567* (2013.01); *H04N 7/15* (2013.01); *H04N 21/234309* (2013.01); *H04N 21/2402* (2013.01); *H04N 21/4788* (2013.01); *H04N 21/6582* (2013.01)

(58) Field of Classification Search
CPC ..... H04L 65/762; H04L 65/765; H04L 65/80; H04M 3/567; H04N 7/15; H04N 21/234309; H04N 21/2402; H04N 21/4788; H04N 21/6582
See application file for complete search history.

(56) References Cited

U.S. PATENT DOCUMENTS

| | | |
|---|---|---|
| 2002/0165993 A1 | 11/2002 | Kramer |
| 2004/0032860 A1 | 2/2004 | Mundra et al. |
| 2004/0098251 A1 | 5/2004 | Vainio et al. |
| 2008/0031153 A1 | 2/2008 | Punreddy et al. |
| 2011/0270967 A1 | 11/2011 | Qiu et al. |
| 2013/0034151 A1* | 2/2013 | Zhou ................ H04N 19/12 375/240.03 |
| 2013/0198767 A1 | 8/2013 | Wang |
| 2013/0208663 A1 | 8/2013 | Kanniappan et al. |
| 2013/0275615 A1* | 10/2013 | Oyman ............. H04L 63/0815 709/231 |
| 2014/0067405 A1* | 3/2014 | Patel ................... G10L 19/22 704/500 |
| 2014/0219088 A1 | 8/2014 | Oyman et al. |
| 2015/0092575 A1 | 4/2015 | Khay-Ibbat et al. |
| 2015/0288607 A1* | 10/2015 | Mani ............... H04W 28/0236 370/230 |
| 2016/0165015 A1 | 6/2016 | Reddappagari et al. |
| 2016/0165058 A1 | 6/2016 | Vander Mey et al. |
| 2016/0165059 A1 | 6/2016 | Deng et al. |
| 2016/0165060 A1 | 6/2016 | Li et al. |
| 2016/0197971 A1 | 7/2016 | Cen et al. |
| 2016/0234506 A1 | 8/2016 | Wang et al. |
| 2017/0303114 A1 | 10/2017 | Johansson et al. |
| 2017/0374116 A1 | 12/2017 | Phillips et al. |
| 2018/0302515 A1 | 10/2018 | Li et al. |
| 2019/0007464 A1* | 1/2019 | Hori .................... H04L 65/70 |
| 2019/0089760 A1 | 3/2019 | Zhang et al. |
| 2019/0104306 A1 | 4/2019 | Wang et al. |
| 2019/0141086 A1 | 5/2019 | Youtz et al. |
| 2020/0260071 A1 | 8/2020 | Hannuksela et al. |

OTHER PUBLICATIONS

Japanese Office Action for the related Application No. 2022-537094, dated Sep. 5, 2023, 4 pages.

* cited by examiner

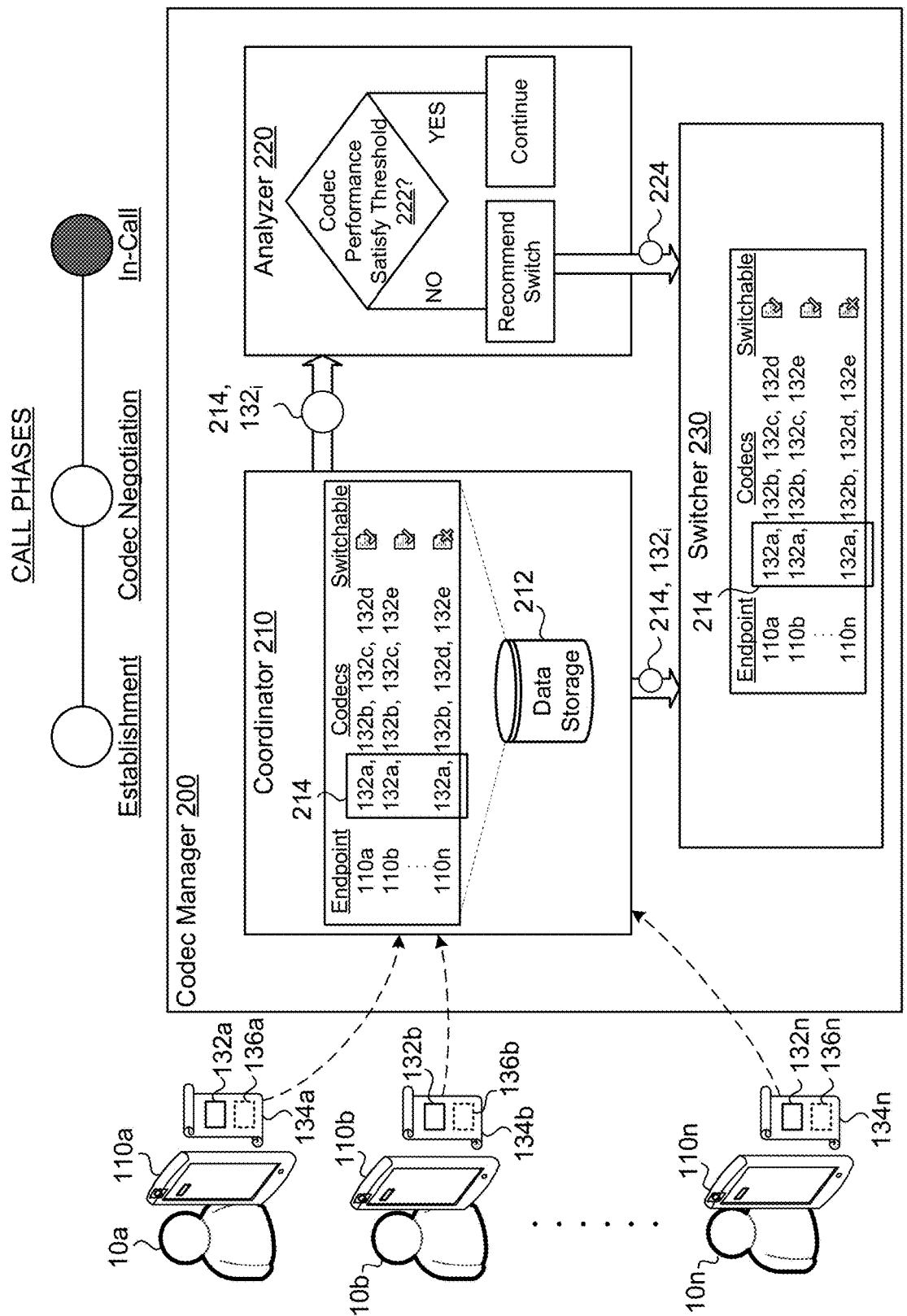

CONTEXT-DEPENDENT IN-CALL VIDEO CODEC SWITCHING

CROSS REFERENCE TO RELATED APPLICATIONS

This U.S. Patent Application is a continuation of, and claims priority under 35 U.S.C. § 120 from, U.S. patent application Ser. No. 16/717,936, filed on Dec. 17, 2019. The disclosure of this prior art application is considered part of the disclosure of this application and is hereby incorporated by reference in its entirety.

TECHNICAL FIELD

This disclosure relates to context-dependent in-call video codec switching.

BACKGROUND

As media data becomes increasingly more common in a wide range of applications, media streams (e.g., video streams) need to be transferred between users and across networks in a reliable manner. When transferring data in the form of a media stream, the endpoints involved in this media communication ensure that they understand the type of data they are receiving and transmitting using a codec. Typically, the codec that will be used when media streams are being transferred between endpoints is negotiated by the endpoints prior to data transfer. This negotiation attempts to account for different applications and/or devices and their need to comply with bandwidth or resource constraints. Yet these constraints combined with other device or network issues during a media communication session, make media streams vulnerable to quality issues. Depending on the issue, a codec may become limited and have difficulty maintaining the quality of a media communication session. This may become particularly detrimental to the session when the codec has been negotiated for use throughout the entirety of the communication session.

SUMMARY

One aspect of the disclosure provides a method for context-dependent in-call video codec switching. The method includes receiving, at data processing hardware, an indication that a far-side endpoint includes a capability to switch from an initial video codec to a secondary video codec during a call. During a call with the far-side endpoint, the method includes determining, by the data processing hardware, that a performance of an encoder satisfies a codec switching threshold. The codec switching threshold indicates that the performance of the encoder justifies switching from the initial video codec mid-stream of the call. During a call with the far-side endpoint, the method also includes switching, by the data processing hardware, from the initial video codec initially negotiated to govern the call to the secondary video codec.

Implementations of the disclosure may include one or more of the following optional features. In some implementations, during the call with the far-side endpoint, the method includes monitoring, by the data processing hardware, the performance of the encoder by comparing an estimated bitrate for the call with an actual bitrate at the encoder. In this implementation, determining that the performance of the encoder satisfies the codec switching threshold occurs when the actual bitrate at the encoder is lower than the estimated bitrate at the encoder. Additionally or alternatively, during the call with the far-side endpoint, the method may include monitoring, by the data processing hardware, the performance of the encoder by comparing an estimated bitrate for the call with an actual bitrate at the encoder, and determining that the performance of the encoder satisfies the codec switching threshold may occur when the actual bitrate at the encoder is higher than the estimated bitrate at the encoder. In some configurations, during the call with the far-side endpoint, the method includes monitoring, by the data processing hardware, the performance of the encoder by comparing an estimated framerate for the call with an actual framerate at the encoder. In this configuration, determining that the performance of the encoder satisfies the codec switching threshold occurs when the actual framerate at the encoder is lower than the estimated framerate at the encoder.

In some examples, the codec switching threshold includes a minimum bitrate for tolerating the performance of the encoder. The minimum bitrate may correspond to a rate of about 100 kb/sec. Receiving the indication that the far-side endpoint includes the capability to switch from the initial video codec to the secondary video codec may occur when a call connection is being established with the far-side endpoint. Optionally, receiving the indication that the far-side endpoint includes the capability to switch from the initial video codec to the secondary video codec may occur during codec negotiation with the far-side endpoint. Additionally or alternatively, receiving the indication that the far-side endpoint includes the capability to switch from the initial video codec to the secondary video codec may occur during the call with the far-side endpoint.

In some configurations, during the call with the far-side endpoint, the method includes soliciting, by the data processing hardware, the far-side endpoint to determine the indication that the far-side endpoint includes the capability to switch from the initial video codec to the secondary video codec during the call. The switching from the initial video codec to the secondary video codec may occur automatically upon the determination that the performance of the encoder satisfies the codec switching threshold. The initial video codec may correspond to a hardware encoder and the secondary video codec may correspond to a software encoder. Here, the software encoder may include a VP8 software encoder.

Another aspect of the disclosure provides a system for context-dependent in-call video codec switching. The system includes data processing hardware and memory hardware in communication with the data processing hardware. The memory hardware stores instructions that when executed on the data processing hardware cause the data processing hardware to perform operations. The operations include receiving an indication that a far-side endpoint includes a capability to switch from an initial video codec to a secondary video codec during a call. During a call with the far-side endpoint, the operations include determining that a performance of an encoder satisfies a codec switching threshold. The codec switching threshold indicates that the performance of the encoder justifies switching from the initial video codec mid-stream of the call. During a call with the far-side endpoint, the operations also include switching from the initial video codec initially negotiated to govern the call to the secondary video codec.

This aspect may include one or more of the following optional features. In some examples, the operations include, during the call with the far-side endpoint, monitoring the performance of the encoder by comparing an estimated bitrate for the call with an actual bitrate at the encoder and determining that the performance of the encoder satisfies the codec switching threshold occurs when the actual bitrate at the encoder is lower than the estimated bitrate at the encoder. Optionally, the operations may include, during the call with the far-side endpoint, monitoring the performance of the encoder by comparing an estimated bitrate for the call with an actual bitrate at the encoder and determining that the performance of the encoder satisfies the codec switching threshold occurs when the actual bitrate at the encoder is higher than the estimated bitrate at the encoder. In some configurations, during the call with the far-side endpoint, the operations include monitoring the performance of the encoder by comparing an estimated framerate for the call with an actual framerate at the encoder. In this configuration, determining that the performance of the encoder satisfies the codec switching threshold occurs when the actual framerate at the encoder is lower than the estimated framerate at the encoder.

In some implementations, the codec switching threshold includes a minimum bitrate for tolerating the performance of the encoder. The minimum bitrate may correspond to a rate of about 100 kb/sec.

In some configurations, receiving the indication that the far-side endpoint includes the capability to switch from the initial video codec to the secondary video codec occurs when a call connection is being established with the far-side endpoint. Optionally, receiving the indication that the far-side endpoint includes the capability to switch from the initial video codec to the secondary video codec may occur during codec negotiation with the far-side endpoint. Additionally or alternatively, receiving the indication that the far-side endpoint includes the capability to switch from the initial video codec to the secondary video codec may occur during the call with the far-side endpoint.

In some examples, the operations include, during the call with the far-side endpoint, soliciting the far-side endpoint to determine the indication that the far-side endpoint includes the capability to switch from the initial video codec to the secondary video codec during the call. The switching from the initial video codec to the secondary video codec may occur automatically upon the determination that the performance of the encoder satisfies the codec switching threshold. In some implementations, the initial video codec corresponds to a hardware encoder and the secondary video codec corresponds to a software encoder. Here, the software encoder may include a VP8 software encoder The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2D are schematic views of an example codec manager for the communication environment of FIG. 1A.

Like reference symbols in the various drawings indicate like elements.

DETAILED DESCRIPTION

Figure 1A:
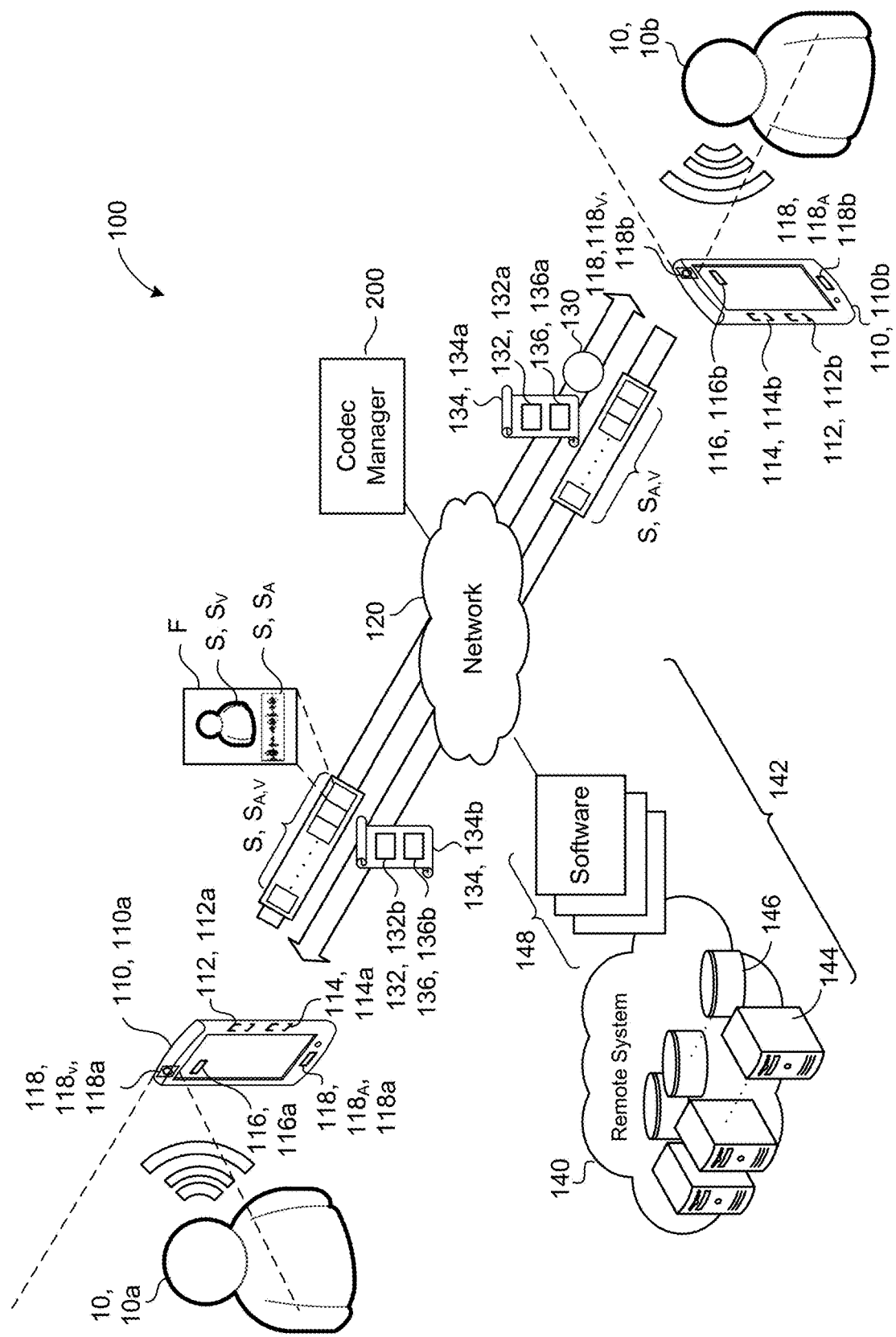
FIG. 1A is a schematic view of an example communication environment.

Communication applications are configured to enable devices (e.g., on behalf of people) to communicate across a network. Each device participating in the communication is referred to as an endpoint. Although devices may have some configurations to communicate as an endpoint in a standalone fashion, generally each device is associated with, and communicates on behalf of, a person using the device. Communication applications host a communication session by functioning as a platform providing a communication channel between endpoints. During this communication session, the communication application is also configured to facilitate communication configurations or rules that govern communication using a communication channel. For instance, a communication channel may be constrained by its own bandwidth or the bandwidth available to one or more endpoints involved in the communication. Due to these constraints, endpoints generally need to synchronize properties of data transferred between endpoints during a communication session. Without synchronizing data properties, the communication between endpoints may suffer or fail based on incompatibilities. For example, a source endpoint may communicate data (e.g., write data) in a format that is not readable by a destination endpoint. This is as though the two endpoints are speaking different languages.

To further complicate data standardization, data may be packaged in many different formats and/or sizes. For example, media communicated between endpoints during a communication session using the communication application may be audio data, video data, or some combination of both. Moreover, each type of data (e.g., audio or video) may have its own properties and/or formatting. For instance, a device that captures the media data may create the media data in a wide range of formats based, for example, on properties of the media capturing device (e.g., manufacturer or type of device) or preferences of a user coordinating the media capture. Stated differently, media capturing devices may have varying degrees of resolution such that the captured data reflects these resolution differences with different sized media data. For instance, a camera that captures video of the user may capture high resolution video (e.g., 4 k video). To accommodate for these variations, a communication application may be configured to not only handle different forms of data, but also configured to coordinate the transfer of these different forms of data between endpoints.

In order to ensure that data communicated between endpoints is compatible for each endpoint, communication applications use codecs that provide standardization for data communication. A codec is configured to generate a standardized digital format for data by encoding or decoding the data. Generally speaking, encoders and/or decoders are data standardization mechanisms that convert data into a particular format or a particular size (e.g., by compression or decompression). Therefore, if both endpoints deploy the same codec or codecs capable of the same standardizations, the data transferred during a communication session is compatible with each endpoint.

Codecs may take the form of software codecs, hardware codecs (e.g., data processing hardware of an endpoint), or some hybrid combination of the two. There may be different advantages or disadvantages to the different forms of codecs. For example, hardware codecs relieve general-purpose processing hardware from encoding and decoding tasks, freeing the data processing hardware to perform other tasks. Although in some examples, preference may be given to a hardware codec over a software codec, hardware codecs may not be supported on all endpoints. Furthermore, when hardware codecs contain errors, these errors may only be remedied by replacing the corresponding hardware. Unfortunately, this is not always a possibility and for circumstances where hardware may be prone to issues, software codecs may be preferable since errors in software codecs can be remedied by, for example, a software upgrade. Moreover, when endpoints executing different operating systems, or using different processing hardware may limit the types of codecs that a communication session may use. For instance, some codecs may be proprietary to a particular vendor or product. In contrast, some codecs are publicly available and, as such, designed to work on a wide variety of processing platforms. To illustrate, VP8 is an open and royalty free video compression format that is available as software. Some further examples of codecs include speech codecs (e.g., G.711, G.722, G.723.1, G.728, G.729, etc.), video codecs (e.g., MPEG-1, MPEG-2, MPEG-4, H.264, H.265 (HEVC)), VP8, VP9, AVI, etc.), videoconferencing codecs (e.g., H.261, H.263, etc.), or other hardware/software devices that function as an analog-to-digital/digital-to-analog converter.

A communication application may establish a communication session by making a call from an endpoint (e.g., an endpoint that is the source of the call) to one or more remote participants, analogous to a making a telephone call. During an initialization phase of the call, the communication application will typically negotiate which codec to select for media transmission. Here, this negotiation process may consider characteristics or factors regarding each endpoint. Some of these factors include the codecs that each endpoint supports and/or the available communication bandwidth between the endpoints. After selecting an appropriate codec, each endpoint using the communication application may transmit and/or receive media content with the selected codec for the duration of the call.

Unfortunately, a communication session governed by a codec negotiated prior to actual communication between endpoints may have its shortcomings. In other words, a communication session may need to change the originally negotiated codec during the communication session due to a change in state for the communication session between endpoints. In some implementations, the available communication bandwidth or processor availability may change during the session/call. In some examples, a hardware codec may break or be known to have issues for the changed state of the communication session. For instance, during the call, a codec may reduce the bitrate of transmitted media due to low bandwidth, but fail to increase the bitrate when available bandwidth is restored. Alternatively, a codec may fail to reduce the bitrate of transmitted media when available bandwidth is or becomes insufficient. Without accommodating for these types of communication session changes, overall user experience may suffer due to degraded quality or increased transmission delays. To address some of these shortcomings the communication environment disclosed herein performs in-call codec switching (e.g., based on the performance of the communication session).

Figure 1B:
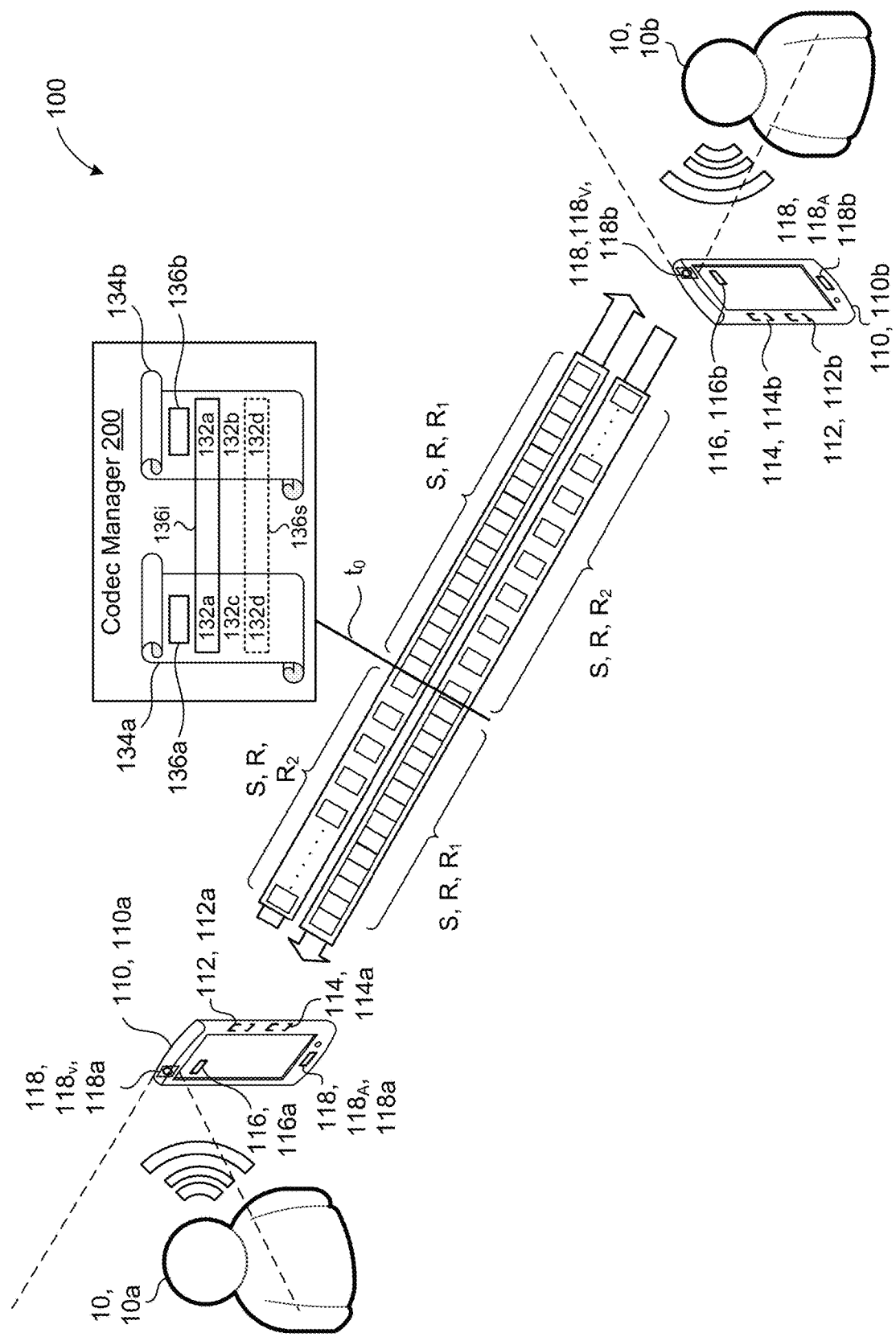
FIG. 1B is a schematic view of the example communication environment switching codecs.

Referring to FIGS. 1A and 1B, in some implementations, a communication environment 100 includes a user device 110 associated with a user 10. The user device 110 (also referred to as a media capturing device, a communication device, or an endpoint) includes hardware, such as data processing hardware 112 and memory hardware 114, and software 116 (e.g., applications such as web-based applications, mobile-based applications, or stand-alone applications) that execute on the hardware. To capture media, the user device includes peripheral(s) 118 such as a video capturing device 118, 118v (e.g., camera) and/or an audio capturing device 118, 118A (e.g., microphone). Other peripherals 118 that the user device 110 may include are a display (e.g., a touch screen or a monitor), speakers, a keyboard, input/output ports, etc. The user device 110 can be any computing device or data processing hardware capable of executing the communication application 116. Some examples of user devices 110 include, but are not limited to, desktop computing devices, mobile computing devices, such as laptops, tablets, or smart phones, and wearable computing devices (e.g., headsets and/or watches).

Using the processing hardware 112 (e.g., the data processing hardware in communication with the memory hardware 112), the user device 110 may execute a communication application 116. As an application 116, the communication application 116 may be web-based, mobile-based, or a standalone application. The communication application 116 may be configured to capture media using peripherals 118 of the user device 110. In some examples, the communication application 116 captures images of the user 10 using the camera 118v and voice of the user 10 using the microphone 118A.

The communication application 116 generally refers to a software application that is able to host a communication session between endpoints (e.g., user devices 110 associated with users 10). During the communication session, the communication application 116 enables each endpoint to communicate media. In other words, the communication application 116 provides the user 10 with a communication channel to receive and/or transmit a media stream S, $S_{A,V}$ that includes audio $S_A$ and/or video $S_V$ (e.g., in the form of image frames F at a particular frame rate). During a communication session, the media stream S is being constantly transferred between endpoints in the form of a bit stream. A bit stream generally refers to a stream of bits where a bit is a basic unit of information that data may be divided into. The bit stream is often quantified by its rate of transfer known as a bit rate (e.g., how many bits are transferred per unit of time). For instance, some software or hardware devices may be rated (i.e., limited to) for a maximum (or minimum) bit rate and a performance of the device may be based on a measure of the device's output bitrate.

In some configurations, the user 10 may, in the communication application 116, select the form of the media stream S that the user 10 intends to communicate. For example, a user 10 selects to transmit an audio stream S, $S_A$ without a corresponding video stream S, $S_V$ (i.e., no video) or a video stream $S_V$ without a corresponding audio stream $S_A$ (e.g., a muted video stream). In some implementations, the communication application 116 automatically changes the form of the communication based on a performance of the communication session (e.g., due to a change in the bit rate for the media stream S). For example, the communication application 116 changes from communication with a video and audio stream $SA_{A,V}$ to solely an audio stream $S_A$.

The communication application 116 may transmit the media stream S from a first endpoint (e.g., the first user device 110a) through a network 120 to a far-side endpoint (e.g., shown as a second user device 110, 100b). For instance, using the communication application 116, a user 10 may make a call 130 (i.e., a request to initiate a communication session) to one or more remote user devices 110 where each remote user device 110 is associated with one or more corresponding remote users 10. Here, the call 130 initially functions as an invite, from a user device 110 that initiates the call 130 to user device(s) 110 of each remote user 10 that requests that each remote user 10 participate in a communication session (e.g., a real-time-communication session). Each source point or destination point for the call 130 may be referred to as an endpoint. For instance, in a basic two-person call (e.g., as shown in FIG. 1A) where first user 10a calls a second user 10b, the first user 10a may be referred to as a first endpoint and the second user 10b may be referred to as a second endpoint. Here, an endpoint that is on the opposite end of the communication channel during the call 130 is referred to as the far-side endpoint. In other words, a destination endpoint is the far-side endpoint for a source endpoint. For instance, the user device 110b of the second user 10b is a far-side endpoint with respect to the user device 110a of the first user 10a and the user device 110a of the first user 10a is a far-side endpoint with respect to the user device 110b of the second user 10b. Similarly, in a multi-participant or conference call, each participant is a far-side endpoint with respect to all other participants.

To initiate the call 130, the communication application 116 may establish a connection with each remote endpoint through a network 120 (e.g., by interactive connectivity establishment (ICE)). Using the established connection, the communication application 116 may facilitate that each endpoint negotiates selection of a codec 132 that is compatible for all endpoints that have been established by the connection. The negotiation of the codec 132 is a process that selects a codec 132 for the communication session that the endpoints will use to encode and/or to decode media transferred through the network 120 during the established communication session. In some examples, endpoints use the Session Initiation Protocol (SIP) to initiate, maintain, and terminate communication sessions. SIP is an Internet Engineering Task Force (IETF)-defined signaling protocol widely used for controlling communication sessions such as voice and/or video calls over Internet Protocol (IP). In some examples, endpoints use a Session Description Protocol (SDP) in conjunction with SIP to negotiate selection of codecs 132. SDP is a format for describing streaming media initialization parameters.

In some implementations, an endpoint is configured to communicate configuration information 134 regarding communication details about the endpoint. For instance, the configuration information 134 includes a list of one or more codecs 132 that the endpoint supports. The sharing of this configuration information 134 may be part of the codec negotiation phase, occur prior to codec negotiation phase (e.g., during call establishment), or occur at some other time during a call 130 between endpoints. In some implementations, an endpoint communicates the configuration information 134 by advertising or signaling acceptable codecs 132 (e.g., a list of acceptable codecs 132) to the far-side endpoint using the communication application 116. In this approach, the signal from the endpoint may solicit a response from the far-side endpoint that includes configuration information 134 for the far-side endpoint. For example, the response from the far-side endpoint lists codecs 132 that the far-side endpoint supports or supports in common with the configuration information 134 provided to the far-side endpoint. Once the codec 132 is initially selected (i.e., negotiated), the communication application 116 may then transmit media as a media stream S to the far-side endpoints using the respective selected codecs 132.

In some implementations, the communication application 116 is configured to select a codec 132 based on the configuration information 134 shared by each endpoint of the call 130. Here, the communication application 116 may select a commonly supported codec 132 that supports the greatest quality of media data. In some configurations, the communication application 116 additionally considers the bandwidth of the communication channel between endpoints when selecting the commonly supported codec 132 that will provide the greatest quality of media data. In other words, although each endpoint is compatible with a codec that supports a high quality media stream S, the communication application 116 determines that the communication channel between the endpoints cannot support the high quality media stream S and instead selects a codec supported by the endpoints that is compatible with the communication channel (e.g., the next most optimal commonly support codec). Additionally or alternatively, when more than one commonly supported codec 132 is available, the communication application 116 is configured to select an optimal codec 132 (e.g., given the properties of the communication channel such as bandwidth). Here, the communication application 116 may also record or note other commonly supported codecs 132 in case the communication application 116 needs to switch codecs 132 during a call 130.

In the case of multiple participants, the communication application 116 may negotiate codec selection with each far-side endpoint. To illustrate, each endpoint may advertise the codecs 132 that it supports (e.g., by providing configuration information 134). With configuration information 134 regarding what types of codecs 132 are supported by the multiple participants, the communication application 116 may select a codec 132 that is supported by each participant. By selecting a commonly supported codec 132, the communication applicant 116 may avoid the media being encoded and/or decoded in several different forms. In implementations when a commonly supported codec 132 is not available, the communication application 116 selects different codecs 132 for some far-side endpoints than for other far-side endpoints.

In some examples, the configuration information 134 includes an indication of whether an endpoint is capable of switching codecs 132 during a call 130. Here, when an endpoint is capable of switching codecs 132 while communicating a media stream S during a call 130 (i.e., "in-call"), the endpoint is considered to have codec switching capability 136. In some implementations, an endpoint's switching capability 136 is communicated with other configuration information 134 (e.g., with the codecs 132 that an endpoint supports). Additionally or alternatively, although the switching capability 136 of an endpoint may be part of the configuration information 134, it may also be identified or referenced at a separate time than other configuration information 134. For instance, the switching capability 136 of an endpoint may be assessed during any of the phases of a call 130 including call establishment, codec negotiation, or in-call. In some examples, the indication of whether an endpoint is capable of switching codecs 132 during a call 130 is implied. For instance, this capability is implied by a version number of a protocol (e.g., SIP or SDP) received by the communication application 116 from a far-side endpoint. Traditionally, if either endpoint switched the codec 132 in use during a call 130, the endpoint risked compromising the communication session, especially when the far-side endpoint is unable to anticipate such a switch or support the codec 132 that an endpoint switches to. In other words, when an endpoint identifies that it has switching capability 136, the endpoint is indicating to other endpoints participating in a call 130 that the endpoint with switching capability 136 anticipates that switching the codec 132 may be best to maintain quality for the media stream S during the communication session and can handle such a change during the call 130 with minimal disruptions to the call quality. In some configurations, an endpoint indicates its switching capability using SIP or other signaling protocol. In some examples, if an endpoint does not positively indicate its switching capability 136, other endpoints consider this lack of indication an inability to switch codecs 132 during the call 130.

In some implementations, the communication application 116 uses a codec manager 200. The codec manager 200 is generally responsible for managing the performance (e.g., quality) of a communication session of the communication application 116. In some examples, the codec manager 200 is a component of the communication application 116 that is stored and executed on the user device 110. In other examples, the communication application 116 is a web-based application that is hosted by a remote system 140 where the codec manager 200 corresponds to a computing resource 142 of the remote system 140. For instance, the remote system 140 is a distributed system or cloud computing environment that leverages its resources 142, such as remote data processing hardware 144 (e.g., servers), remote memory hardware 146 (e.g., databases or data stores), or remote software 148. Here, the communication application 116 and/or the codec manager 200 may be software resources 148 hosted by the remote system 140, but accessible from the user device 110.

With continued reference to FIG. 1A, the first user 10a uses his or her user device 110a to call the second user 10b on his or her user device 110b. Here, the communication application 116 facilitates the call 130 between the first user 10a and the second user 10b. Once the call has been established, the endpoints perform codec negotiation. During or prior to codec negotiation, the users 10 share configuration information 134 that identifies one or more codecs 132 that each user device 110 (i.e., endpoints) supports. With identification of the codecs 132 supported by each endpoint, the communication application 116 selects a commonly supported codec 132 to be used during the call 130 between the users 10a-b. In some examples, the communication application 116 is configured to select a codec 132 that optimizes quality for the media stream S being sent through the communication channel between endpoints. With a codec 132 selected, each endpoint uses the codec 132 to encode or decode the media streams S transferred over the communication channel during the communication session (i.e., the call 130) between the endpoints.

During the call 130, FIG. 1B illustrates that the codec manager 200 recognizes a degradation in quality of the communication session. Due to this recognition, at time to the codec manager 200 switches from an initial codec 132, $132_i$ that being initially used during the call 130 to a secondary codec 132, $132_s$. In order to perform the codec switch, the codec manager 200 determines that both endpoints (e.g., the first user device 110a and the second user device 110b) have switching capabilities 136, 136a-b. When the codec manager 200 confirms that two or more endpoints have switching capabilities 136, the codec manager 200 identifies each codec 132 supported by each endpoint. For example, the codec manager 200 is shown identifying that the first endpoint (e.g., the first user device 110a) indicates that it supports codecs 132, 132a,c,b (e.g., in its configuration information 134a) and that the second endpoint (e.g., the second user device 110b) indicates that it supports codecs 132, 132a,b,d. Here, the rectangular block labeled as the initial codec $132_i$ represents that the current codec 132 that is being used at time to in the communication session is the first codec 132, 132a that each endpoint shares. In this example, the codec manager 200 switches to a second codec $132_s$ shown as the fourth codec 132, 132d. The codec manager 200 selects the fourth codec 132d because both a second codec 132, 132b and a third codec 132, 132c are not supported by each endpoint. For instance, the first device 110a does not support the second codec 132b and the second device 110b does not support the third codec 132c. Based on this analysis, the codec manager 200 at time $t_0$ switches the initial codec $132_i$, 132a to the secondary codec $132_s$, 132d. The codec manager 200 may select between other combinations of initial codec $132_i$ and secondary codec $132_s$ in response to recognizing a degradation in quality of the communication session. In some examples, the initial codec $132_i$ is H.265 and the secondary codec $132_s$ is VP8. In other examples, the initial codec $132_i$ is HEVC and the secondary codec $132_s$ is, e.g., H.265 or VP9.

Although FIG. 1B depicts only one iteration of switching codecs 132, the codec manager 200 may be configured to switch the codecs 132 as many times as the codec manager 200 deems necessary to satisfy a particular quality or performance threshold for the communication session. For instance, the quality may improve in the communication session and the codec manager 200 may switch the codec 132 back to the initial codec $132_i$ or to a completely different compatible codec 132 (not shown). When the codec manager 200 switches codecs 132, FIG. 1B illustrates that the secondary codec $132_s$ changes the frame rate R for the media stream S. In other words, to maintain quality, the codec manager 200 changes codecs 132 to reduce the bitrate of the media stream S by reducing the frame rate R from a first frame rate R, $R_1$ (e.g., 60 frames per second) to a second frame rate R, $R_2$ (e.g., 30 frames per second). Although here, the bitrate is adjusted by a change in frame rate R, the bitrate may additionally or alternatively be adjusted in other ways, such as changing a size of the frames that constitute the media stream S. In other words, in this example, the codec manager 200 decides it needs to reduce the bitrate to maintain quality for the user's experience as the user 10 participates in the communication session. Yet the codec manager 200 may take other management approaches such as increasing the bitrate. In some implementations, codec manager 200 waits a threshold period of time after one iteration of switching codecs 132 before performing a subsequent iteration.

Figure 2A:
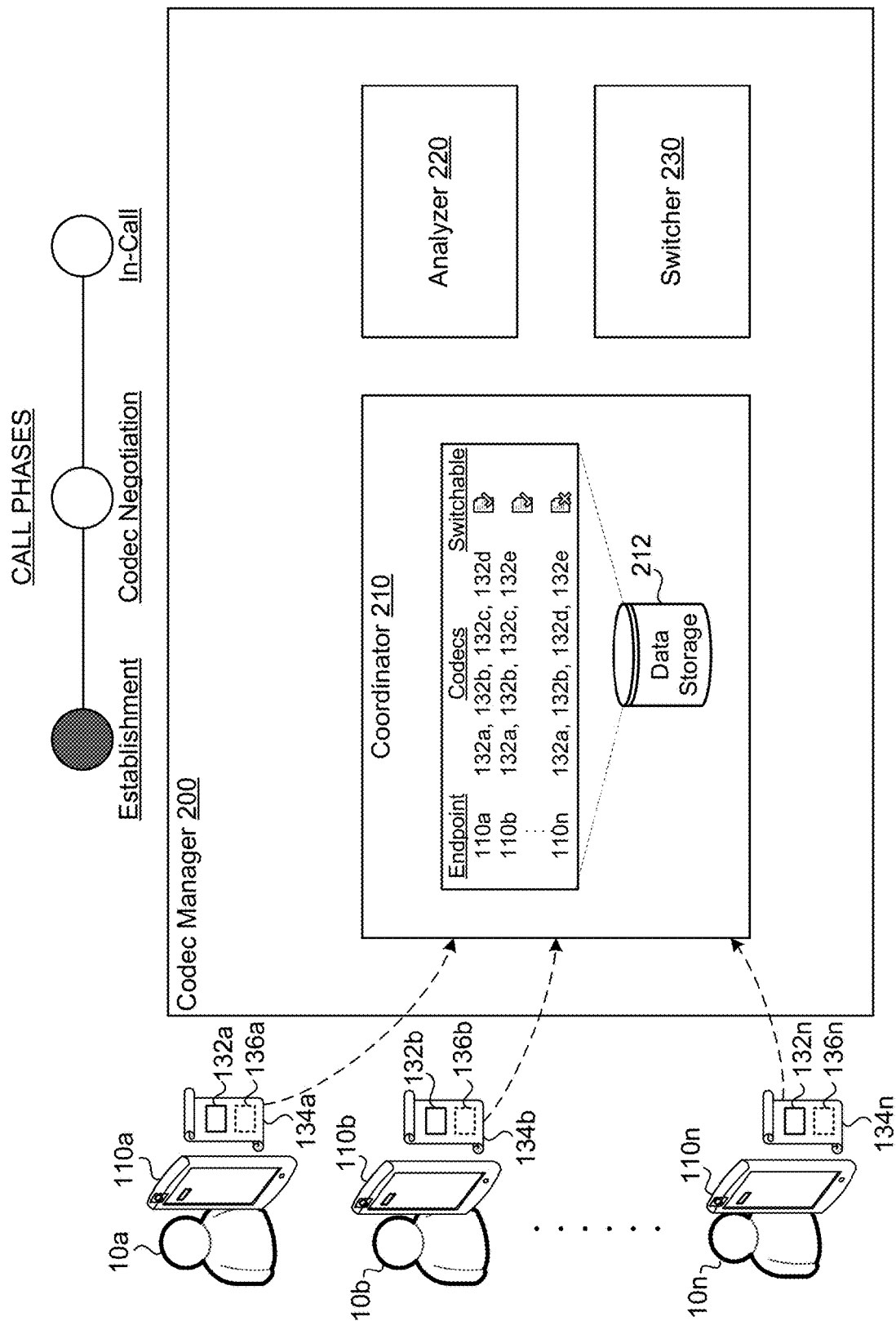
Figure 2B:
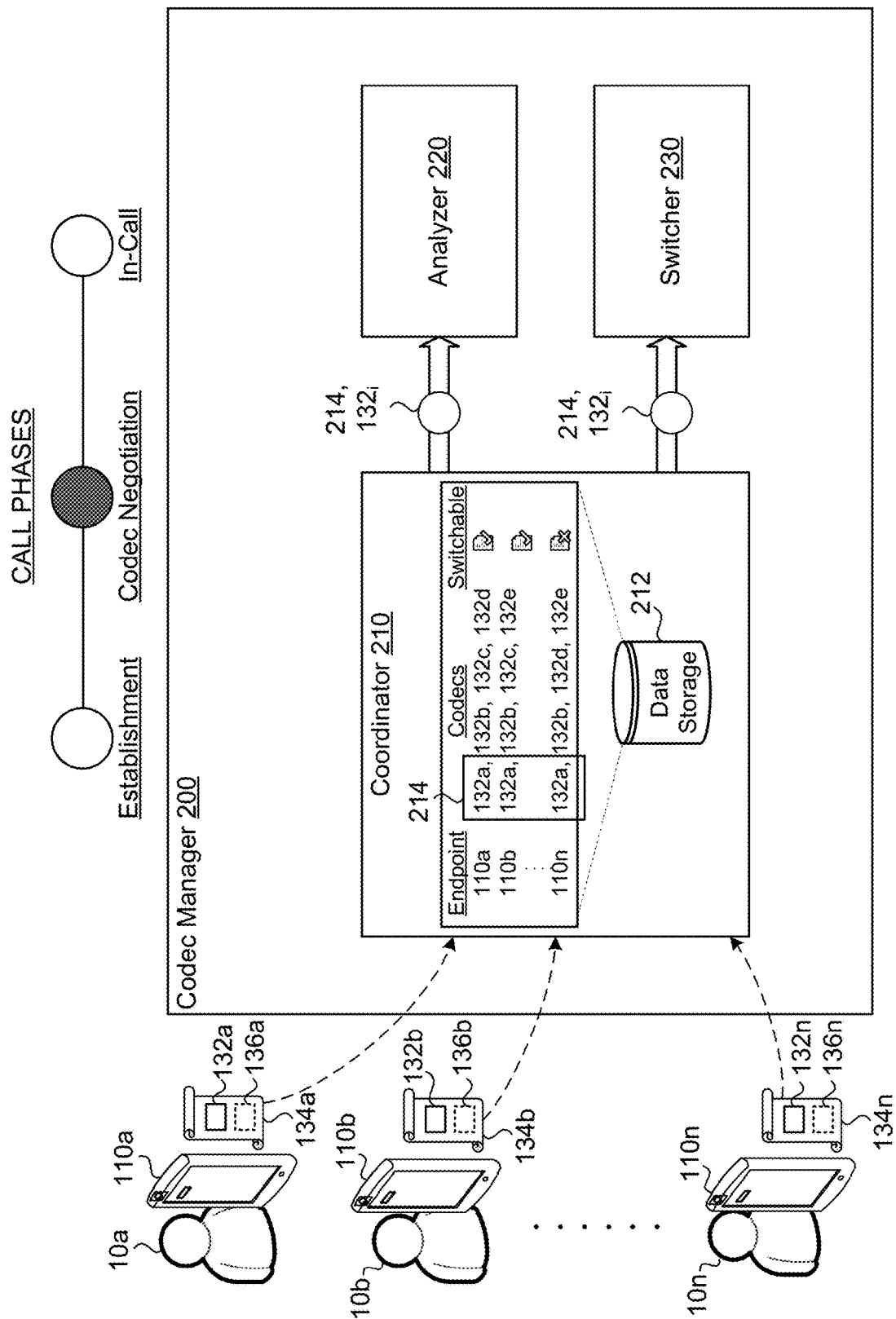
Figure 2D:
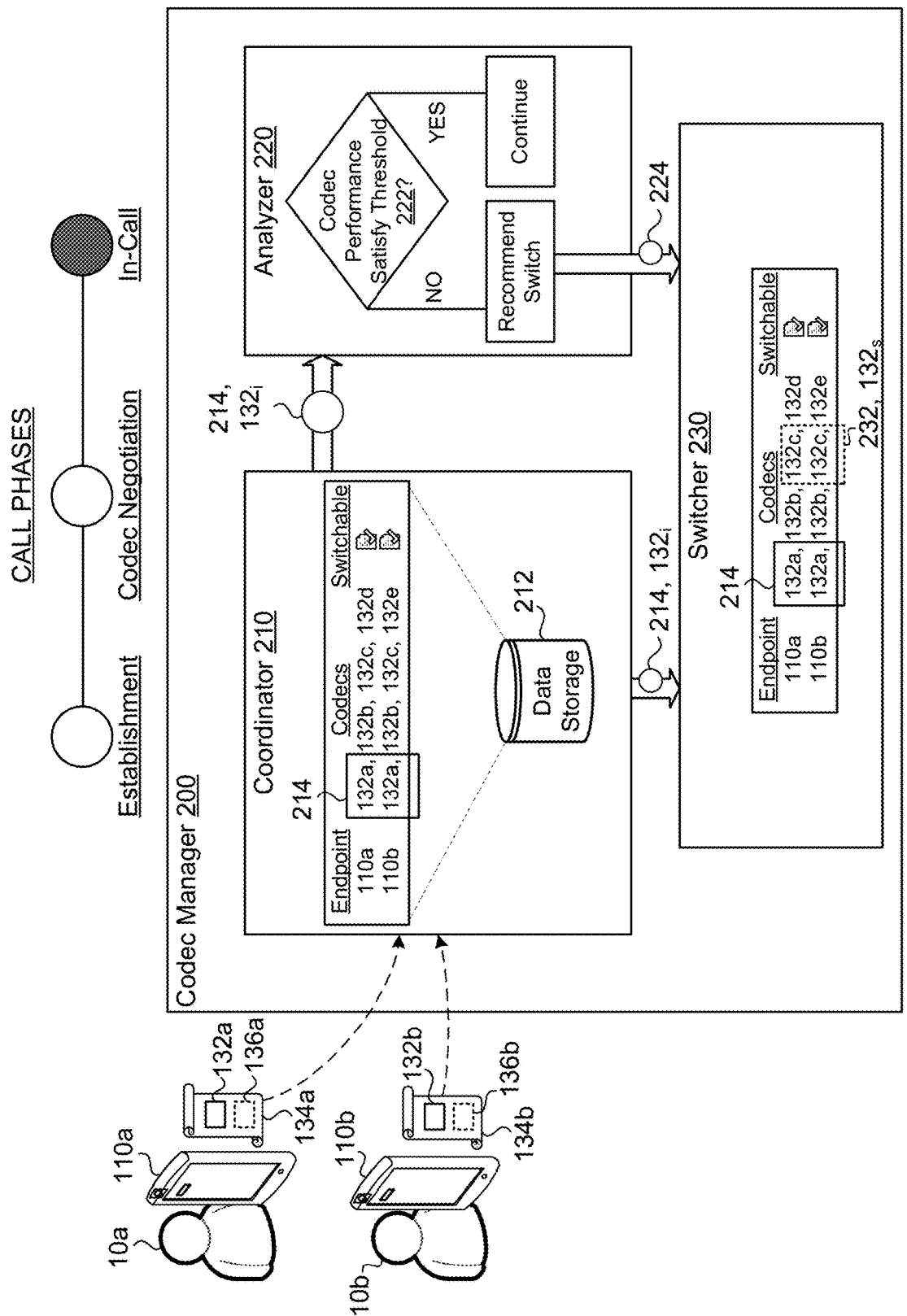

In FIGS. 2A-2D, each figure corresponds to at least one phase of a call 130. Each figure identifies the phase of the call 130 that is being represented in the figure by a shaded dot over the phase label above the codec manager 200. For example, FIG. 2A represents examples of the functionality of the codec manager 200 during the call establishment phase. FIG. 2B represents examples of the functionality of the codec manager 200 during the codec negotiation phase. FIGS. 2C and 2D represent examples of the functionality of the coordinator 210 during the call 130 when the endpoints are implementing the negotiated codec(s) 132.

Referring to FIGS. 2A-2D, the codec manager 200 includes a coordinator 210, an analyzer 220, and a switcher 230. The coordinator 210 is configured to obtain (e.g., solicit or receive) and/or to determine configuration information 134 for one or more user devices 110 involved in a communication session of a call 130. For instance, the coordinator 210 includes a database 212 or other storage means that stores configuration information 134 for the endpoints of a call 130. The coordinator 210 may store the configuration information 134 as a data pair corresponding to a particular user device 110 and the one or more codecs 132 that are supported by the user device 110. As shown in FIG. 2A, in some configurations, the coordinator 210 receives the configuration information 134 during the call establishment phase. In some examples, the coordinator 210 also acquires and/or receives configuration information 134 or the lack thereof that indicates whether an endpoint has codec switching capability 136. In some implementations, when the coordinator 210 receives configuration information 134 without an indication that an endpoint has codec switching capability 136, the coordinator 210 determines that the endpoint does not have codec switching capability 136 (e.g., to avoid future switching issues). As illustrated by FIGS. 2A-2D, the coordinator 210 may receive the switching capability for an endpoint (e.g., a user device 110) at any phase. For example, FIG. 2A depicts the coordinator 210 receiving the switching capability 136 during the call establishment phase with other call establishment information, such as the configuration information 134; while, in FIG. 2B, the coordinator 210 receives the switching capability 136 during codec negotiation (e.g., with the codec(s) 132 for an endpoint). Additionally or alternatively, the coordinator 210 receives the switching capability 136 in-call. For example, the analyzer 220 determines that the communication session is experiencing issues and may initiate the codec manager 200 (e.g., through the coordinator 210) to obtain or to determine the switching capabilities 136 for the endpoints involved in the call 130. When this occurs during the call 130 (e.g., as shown in FIG. 2C), the coordinator 210 may communicate either outside the communication bandwidth configured for the communication session or coordinate by some other manner to identify switching capability 136 while streaming the media.

Once the endpoints participating in the call 130 have been established during the call establishment phase, the coordinator 210 is configured to perform codec negotiation. In some examples, such as FIG. 2A, the coordinator 210 receives the configuration information 134 that includes each endpoint's supported codec(s) 132 during call establishment. Yet in other examples, the coordinator 210 may request and/or receive each endpoint's supported codec(s) 132 after call establishment or some blend of during and after call establishment. The codec manager 200 may find it more efficient to obtain codec information from endpoints that agree to establish a communication session, for example, especially when one or more endpoints may decline to establish the communication session. Referring to FIG. 2B, once the coordinator 210 receives the codec information (e.g., supported codecs 132) for the endpoints, the coordinator 210 selects an initial codec 132, $132_i$ supported by the participating endpoints that will govern the call 130 (i.e., that the endpoints will use to encode and decode media data during the call 130). Here, in FIG. 2B, the selection 214 of the initial codec $132_i$ corresponds to a first codec 132, 132a supported by each endpoint 110a-n. Following the selection 214 of the initial codec $132_i$, the coordinator 210 is configured to communicate the initial codec $132_i$ to other components of the codec manager 200 (e.g., the analyzer 220 and/or the switcher 230).

With the initial codec $132_i$, each endpoint uses the codec 132 to serve as both an encoder when transmitting media data (e.g., to far-side endpoint(s)) and a decoder when receiving media data (e.g., from far-side endpoint(s)). With codecs 132, the data format for the media stream S generally conforms to a standard video compression specification such that the same codec 132 deployed by the far-side endpoint has the same or similar encoded/decoder capabilities. The analyzer 220 is configured to monitor a performance of codecs 132 while being used during the call 130. For example, the analyzer 220 is configured to monitor the performance of the encoder portion of the codec 132 and/or the decoder portion of the codec 132. Although herein, the analyzer 220 is described with respect to monitoring the encoder portion of the codec 132, the same functionality of the analyzer 220 may apply to the decoder portion of the codec 132.

In some examples, the analyzer 220 is configured to determine whether a performance of an encoder/decoder satisfies a codec switching threshold 222. The analyzer 220 may perform this determination through continuous monitoring or at some set interval during the call 130. Here, the codec switching threshold 222 indicates that the performance of the encoder/decoder justifies switching from the initial codec $132_i$ (e.g., an initial video codec) while the media stream S is being communicated during the call 130 (i.e., mid-stream). The switching threshold 222 may be configured by an administrator or user (e.g., the user 10) of the codec manager 200 or the communication application 116. The switching threshold 222 may be configured on a per codec 132 level or as a more general performance metric. When the codec performance satisfies the switching threshold 222, the analyzer 220 generates a recommendation 224 to the codec manager 200 (e.g., the switcher 230) to change codecs 132 from the current codec 132 (e.g., the initial codec $132_i$) to a fallback or a secondary codec $132_s$. When the codec performance fails to satisfy the switching threshold 222, the analyzer 220 forms no recommendation 224 (e.g., allows the current codec 132 to continue operation). In other words, the switching threshold 222 represents a detrimental condition during the call 130.

In some examples, the analyzer 220 only operates its monitoring procedure when the endpoints have switching capability 136 (e.g., as shown in FIG. 2D). Alternatively, the analyzer 220 may perform the monitoring procedure and generate recommendation(s) 224 regardless of the switching capabilities 136 of the endpoint (e.g., as shown in FIG. 2C). In this alternative, other components of the codec manager 200, such as the switcher 230, may be configured to determine whether codec switching is feasible when the recommendation 224 is received.

In some implementations, the switching threshold 222 corresponds to a minimum value such that when the performance metric is below that minimum value, the analyzer 220 determines that the codec performance (e.g., of the encoder or decoder) fails to satisfy the switching threshold 222 and generates a recommendation 224 that the codec manager 200 switch from the current codec 132 (e.g., the initial codec $132_i$) to a fallback or a secondary codec $132_s$. In contrast, the switching threshold 222 may be configured as a maximum value such that when the performance metric exceeds that maximum value, the analyzer 220 determines that the codec performance (e.g., of the encoder or decoder) fails to satisfy the switching threshold 222 and generates a recommendation 224 that the codec manager 200 switch from the current codec 132 (e.g., the initial codec $132_i$) to a fallback or a secondary codec $132_s$. For example, the codec manager 200 uses a maximum to detect that a codec 132 may be broken and providing too much bitrate (or frame rate) through the communication channel to the far-side endpoint. In some configurations, the analyzer 220 may include more than one switching threshold 222. For instance, the analyzer 220 includes general maximums, general minimums, codec specific maximums, and/or codec specific minimums (e.g., such that multiple thresholds 222 are enforced by the analyzer 220). To illustrate the switching threshold 222 may be universally set to a minimum bitrate value (e.g., less than 100 kb/s, 80 kb/s, or 50 kb/s) or a minimum frame rate (e.g., less than 10 fps or 5 fps). Additionally or alternatively, the analyzer 220 may have a switching threshold 222 of 100 kb/s for a first codec 132a, a switching threshold 222 of 80 kb/s for a second codec 132b, and/or a switching threshold 222 of 50 kb/s for a third codec 132c.

Some codecs 132 may have switching thresholds 222 set to a particular threshold value (e.g., a minimum or maximum bitrate or frame rate) because the particular codec 132 may be known to have issues encoding or decoding at or near a particular bitrate (or frame rate) or range of bitrates/frame rates (e.g., between 50 kb/s-150 kb/s or between 5 fps-10 fps). For example, a hardware codec 132 such as HEVC, can have difficulty operating at low frame rates (or bitrates). Here, this difficulty may result in a codec 132 potentially getting stuck encoding/decoding at a low frame rate and subsequently unable to recover when the codec 132 is theoretically able to increase the frame rate (or bitrate). To illustrate, based on this known or determined difficulty, the HEVC codec 132 may be associated with a switching threshold 222 of 50 kb/s or 5 frames per second (fps).

In some configurations, as the analyzer 220 performs monitoring of codecs 132, the analyzer 220 becomes aware (e.g., self-aware or by indication from another entity) that particular codecs 132 experience issues at certain bit rates or frame rates. Here, the analyzer 220 or some other component of the codec manager 200 may log these issues and learn of new switching thresholds 222. In some examples, these learned thresholds 222 may be automatically applied by the analyzer 220 or the analyzer 220 may obtain permission to apply these learned thresholds 222.

In some examples, the analyzer 220 is configured to monitor the performance of a codec 132 by monitoring an estimated bitrate for the call 130 and/or an actual bitrate for the call 130. For instance, the estimated bitrate may be the bitrate that an endpoint anticipates based on properties of the communication session, such as the bandwidth of the communication channel. In other words, the properties of the communication channel and the endpoints (e.g., source and/or destination endpoints) indicate that an endpoint should generate the media stream S at or near a particular bitrate. The analyzer 220 may then compare this estimated bitrate to the actual bitrate that an endpoint is producing. In some configurations, the switching threshold 222 is a value that indicates an acceptable tolerance for the difference between the actual bitrate and the estimated bitrate. For instance, the analyzer 220 configures the switching threshold 222 at a value of 100 kb/s to indicate that, if the difference between the actual bitrate and the estimated bitrate is greater than this value, the analyzer 220 generates a recommendation 224 to switch codecs 132. In some implementations, the analyzer 220 generates a recommendation 224 to switch codecs 132 for a variance between the actual bitrate and the estimated bitrate. In other words, when the actual bitrate is lower than the estimated bitrate, the analyzer 220 generates a recommendation 224 to switch codecs 132. Here, this may indicate that the codec 132 is underperforming. In contrast, when the actual bitrate is greater than the estimated bitrate, the analyzer 220 generates a recommendation 224 to switch codecs 132 because the codec 132 appears to be failing to accommodate (e.g., adjusting) for the actual properties of the communication session.

When the switcher 230 receives the recommendation 224 from the analyzer 220, the switcher 230 may initially determine whether the endpoints involved in the call 130 have switching capabilities 136. Here, the switcher 230 may refer to the configuration information 134 at the coordinator 210 or initiate that the coordinator 210 now solicit the endpoints to determine if each endpoint has switching capability 136. In some examples, by the time the recommendation 224 is made, the codec manager 200 has already determined that the endpoints of the call 130 have switching compatibility 136 and automatically switch codecs 132. When the switcher 230 changes codecs 132, the switcher 230 identifies commonly supported codecs 132 of the endpoints similar to the codec negotiation phase. Referring to FIG. 2D, the switcher 230 identifies that besides the current or initial codec 132a, 132$_i$, the endpoints 110a-b also commonly support a second codec 132b and a third codec 132c. With more than one choice for the secondary codec 132$_s$, the switcher 230 may additionally determine which of these options is more optimal to the current conditions (e.g., bitrate, frame rate, current channel bandwidth, etc.) of the communication session and select the most optimal choice. In some configurations, the switcher 230 is configured to change types of codecs 132 during the switch 232 if possible. For example, when the initial codec 132$_i$ is a hardware codec 132, the switcher 230 selects a software codec 132 as the secondary codec 132$_s$ (also referred to as a fallback codec 132) or vice versa. When comparing FIGS. 2C and 2D, the switcher 230 is unable to perform a switch 232 in FIG. 2C because an endpoint 110, 110n does not have switching capability 136. In some instances, such as FIG. 2C, with multiple endpoints, the switcher 230 may switch the codecs 132 of some endpoints, but not others as long as these codecs support similar standardization.

Figure 3:
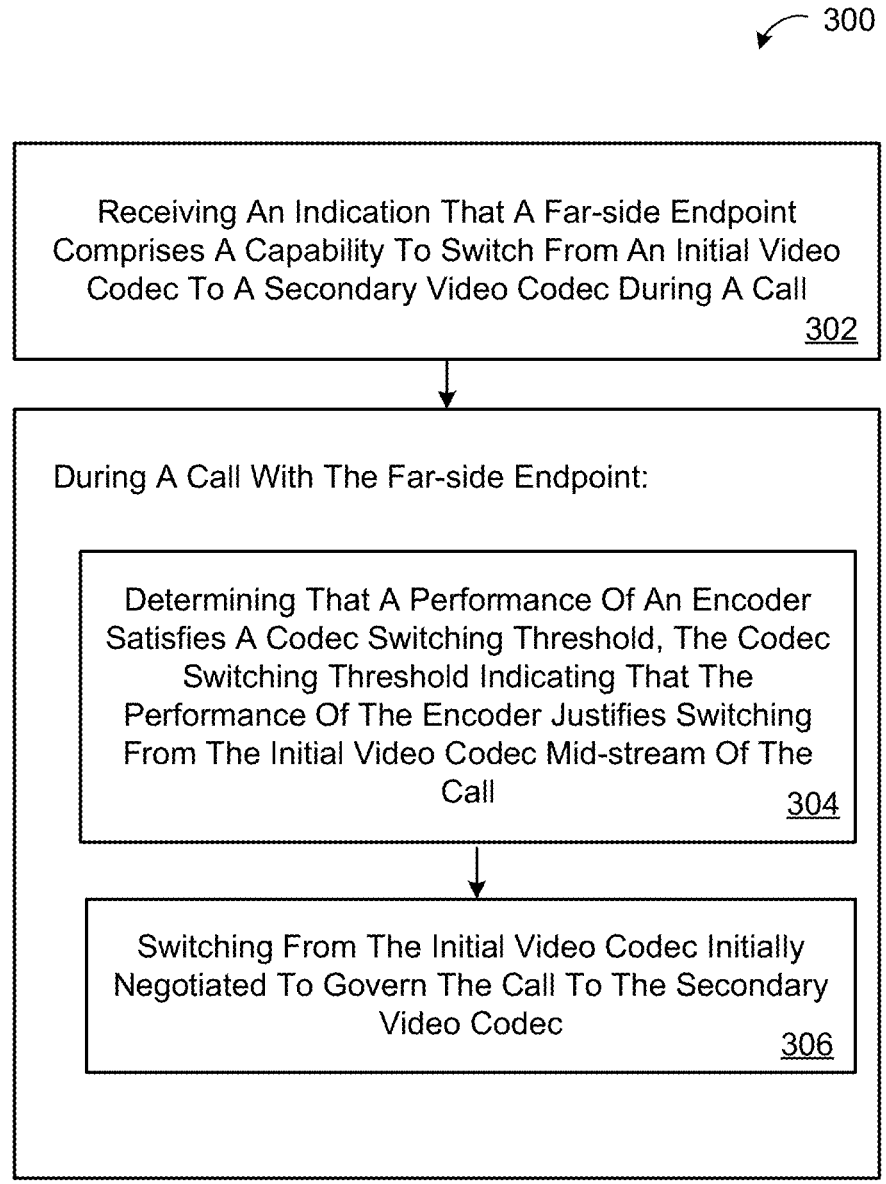
FIG. 3 is a flowchart of an example arrangement of operations for a method of context-dependent in-call video codec switching.

FIG. 3 provides an example arrangement of operations for a method 300 of context-dependent, in-call video codec switching. At operation 302, the method 300 includes receiving, at data processing hardware 112, an indication 136 that a far-side endpoint 110 includes a capability to switch from an initial video codec 134$_i$ to a secondary video codec 132$_s$ during a call 130. Receiving the indication 136 that the far-side endpoint 110 includes the capability to switch from the initial video codec 132$_i$ to the secondary video codec 132$_s$ may occur when a call connection is being established with the far-side endpoint 110, and/or during codec negotiation with the far-side endpoint 110, and/or during the call 130 with the far-side endpoint 110. In some implementations, the method 300 further includes soliciting the far-side endpoint 110 during the call 130, by the data processing hardware 112, to determine the indication 136 that the far-side endpoint 110 includes the capability to switch from the initial video codec 132$_i$ to the secondary video codec 132$_s$ during the call 130.

At operation 304, the method 300 includes determining, by the data processing hardware 112, that a performance of an encoder satisfies a codec-switching threshold 222, the codec-switching threshold 222 indicating that the performance of the encoder justifies switching from the initial video codec 134$_i$ mid-stream of the call 130. In some implementations, the codec switching threshold 222 includes a minimum bitrate for tolerating the performance of the encoder. The minimum bitrate may correspond to a rate of about 100 kb/sec. In some implementations, the method 300 further includes, during the call 130 with the far-side endpoint 110, monitoring, by the data processing hardware 112, the performance of the encoder by comparing an estimated bitrate for the call 130 with an actual bitrate at the encoder. In these examples, determining that the performance of the encoder satisfies the codec-switching threshold 222 may occur when the actual bitrate at the encoder is lower than the estimated bitrate at the encoder and/or when the actual bitrate at the encoder is higher than the estimated the bitrate at the encoder. At operation 306, the method 300 includes switching, by the data processing hardware 112, from the initial video codec $132_i$ initially negotiated to govern the call 130 to the secondary video codec $132_s$. In some implementation, switching from the initial video codec $132_i$ to the secondary video codec $132_s$ occurs automatically upon the determination that the performance of the encoder satisfies the codec-switching threshold 222. In some examples, the initial video codec $132_i$ corresponds to a hardware encoder and the secondary video codec $132_s$ corresponds to a software encoder, e.g., a VP8 software encoder. In other examples, the initial codec $132_i$ is HEVC and the secondary codec $132_s$ is H.265.

Figure 4:
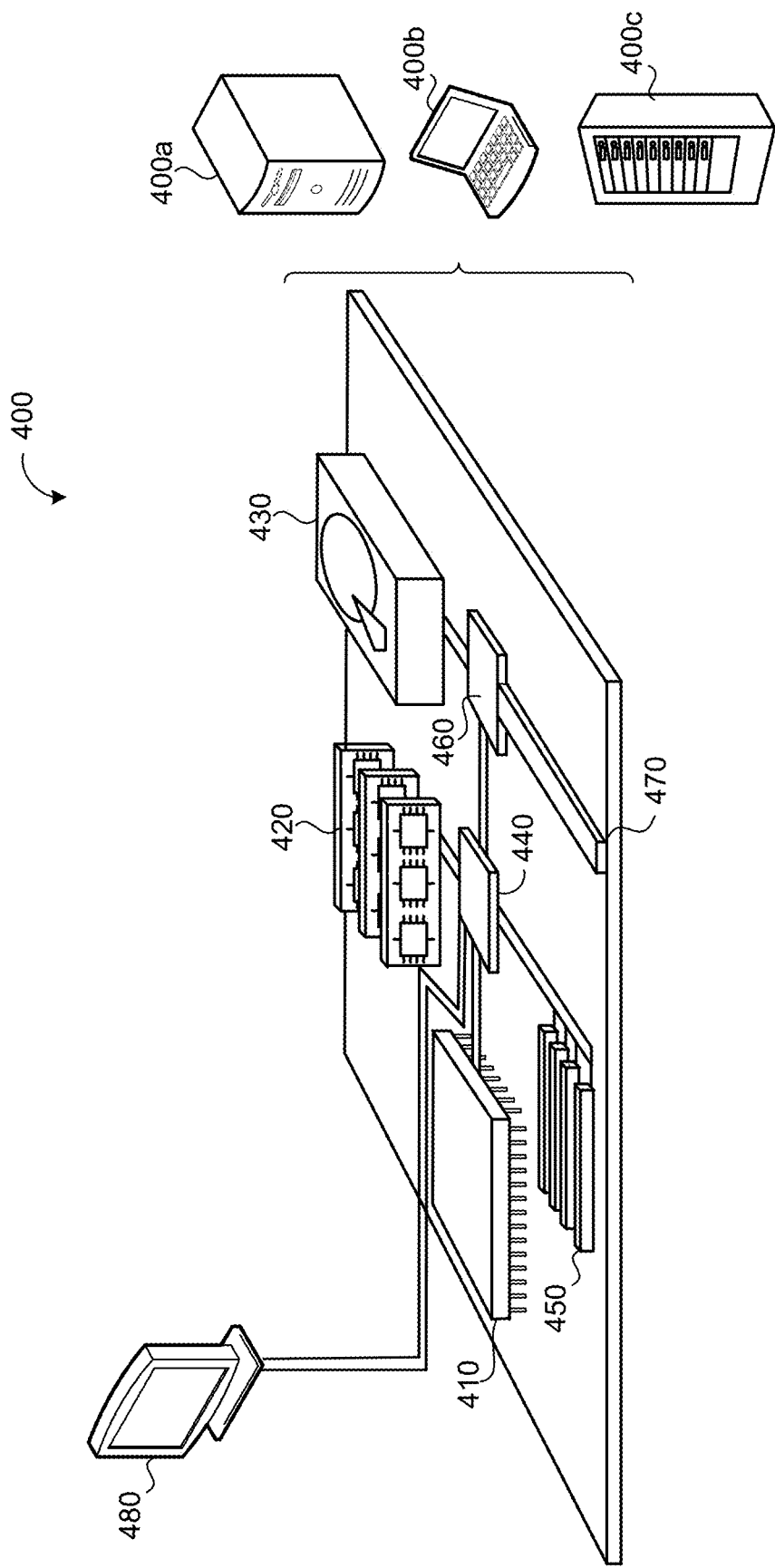
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
  receiving, from each respective endpoint of a plurality of endpoints, a list of audio codecs, the list of audio codecs comprising one or more audio codecs supported by the respective endpoint;
  selecting an initial audio codec from the received lists of audio codecs for a communication session, the initial audio codec supported by each respective endpoint of the plurality of endpoints;
  determining an estimated bitrate of the initial audio codec prior to use of the initial audio codec based on one or more properties of a communication channel for the communication session or one or more properties of the plurality of endpoints; and
  during a call between the plurality of endpoints using the initial audio codec:
    determining an actual bitrate of the initial audio codec that the initial audio codec is producing during the call;
    determining, based on a comparison of the estimated bitrate of the initial audio codec and the actual bitrate of the initial audio codec during the call, that an actual performance of the initial audio codec during the call satisfies a switching threshold; and
    selecting a secondary audio codec from the received lists of audio codecs, the secondary audio codec supported by each respective endpoint of the plurality of endpoints; and
    switching from the initial audio codec to the secondary audio codec for the communication session.

2. The computer-implemented method of claim 1, wherein the operations further comprise receiving an indication that one respective endpoint of the plurality of endpoints comprises a capability to switch from the initial audio codec to the secondary audio codec during a call between the plurality of endpoints.

3. The computer-implemented method of claim 2, wherein receiving the indication occurs when a call connection is being established among the plurality of endpoints.

4. The computer-implemented method of claim 2, wherein receiving the indication occurs during codec negotiation among the plurality of endpoints.

5. The computer-implemented method of claim 2, wherein receiving the indication occurs during the call with the plurality of endpoints.

6. The computer-implemented method of claim 1, wherein switching from the initial audio codec to the secondary audio codec occurs automatically upon the determination that the actual performance of the initial audio codec during the call satisfies the switching threshold.

7. The computer-implemented method of claim 1, wherein determining that the actual performance of the initial audio codec during the call satisfies the switching threshold occurs when the actual bitrate at an encoder during the call is lower than the estimated bitrate at an encoder.

8. The computer-implemented method of claim 1, wherein determining that the actual performance of the initial audio codec during the call satisfies the switching threshold occurs when the actual bitrate at an encoder is higher than the estimated bitrate at an encoder.

9. The computer-implemented method of claim 1, wherein the switching threshold comprises a minimum bitrate for an encoder for one of the plurality of endpoints.

10. The computer-implemented method of claim 1, wherein the operations further comprise, during the call between the plurality of endpoints:
  monitoring the actual performance of the initial audio codec during the call by comparing, at an encoder for one of the plurality of endpoints, an estimated framerate with an actual framerate, and
  wherein determining that the actual performance of the initial audio codec during the call satisfies the switching threshold occurs when the actual framerate is lower than the estimated.

11. A system comprising:
  data processing hardware; and
  memory hardware in communication with the data processing hardware, the memory hardware storing instructions that, when executed on the data processing hardware, cause the data processing hardware to perform operations comprising:
receiving, from each respective endpoint of a plurality of endpoints, a list of audio codecs, the list of audio codecs comprising one or more audio codecs supported by the respective endpoint;
selecting an initial audio codec from the received lists of audio codecs for a communication session, the initial audio codec supported by each respective endpoint of the plurality of endpoints;
determining an estimated bitrate of the initial audio codec prior to use of the initial audio codec based on one or more properties of a communication channel for the communication session or one or more properties of the plurality of endpoints; and
during a call between the plurality of endpoints using the initial audio codec:
  determining an actual bitrate of the initial audio codec that the initial audio codec is producing during the call;
  determining, based on a comparison of the estimated bitrate of the initial audio codec and the actual bitrate of the initial audio codec during the call, that an actual performance of the initial audio codec during the call satisfies a switching threshold; and
  based on determining that the actual performance of the initial audio codec during the call satisfies the switching threshold:
    selecting a secondary audio codec from the received lists of audio codecs, the secondary audio codec supported by each respective endpoint of the plurality of endpoints; and
    switching from the initial audio codec to the secondary audio codec for the communication session.

12. The system of claim 11, wherein the operations further comprise receiving an indication that one respective endpoint of the plurality of endpoints comprises a capability to switch from the initial audio codec to the secondary audio codec during a call between the plurality of endpoints.

13. The system of claim 12, wherein receiving the indication occurs when a call connection is being established among the plurality of endpoints.

14. The system of claim 12, wherein receiving the indication occurs during codec negotiation among the plurality of endpoints.

15. The system of claim 12, wherein receiving the indication occurs during the call with the plurality of endpoints.

16. The system of claim 11, wherein switching from the initial audio codec to the secondary audio codec occurs automatically upon the determination that the actual performance of the initial audio codec during the call satisfies the switching threshold.

17. The system of claim 11, wherein determining that the actual performance of the initial audio codec during the call satisfies the switching threshold occurs when the actual bitrate at an encoder during the call is lower than the estimated bitrate at an encoder.

18. The system of claim 11, wherein determining that the actual performance of the initial audio codec during the call satisfies the switching threshold occurs when the actual bitrate at an encoder is higher than the estimated bitrate at an encoder.

19. The system of claim 11, wherein the switching threshold comprises a minimum bitrate for an encoder for one of the plurality of endpoints.

20. The system of claim 11, wherein the operations further comprise, during the call between the plurality of endpoints:
  monitoring the actual performance of the initial audio codec during the call by comparing, at an encoder for one of the plurality of endpoints, an estimated framerate with an actual framerate, and
  wherein determining that the actual performance of the initial audio codec during the call satisfies the switching threshold occurs when the actual framerate is lower than the estimated framerate.

* * * * *